(12) United States Patent
Shmueli et al.

(10) Patent No.: US 12,510,674 B2
(45) Date of Patent: Dec. 30, 2025

(54) BROKERING REAL TIME KINEMATICS (RTK) POSITIONING DATA FOR DYNAMICALLY DEFINED ZONES

(71) Applicant: Blue White Robotics Ltd, Tel Aviv (IL)

(72) Inventors: Aviram Shmueli, Modiln (IL); Alon Ascher, Tel Aviv (IL); Ben Alfi, Tel Aviv (IL); Dor Halperin, Ramat Gan (IL); Paz Aranyi, Haifa (IL); Ron Berenstein, Kfar-Saba (IL)

(73) Assignee: Blue White Robotics Ltd, Tel Aviv (IL)

( * ) Notice: Subject to any disclaimer, the term of this patent is extended or adjusted under 35 U.S.C. 154(b) by 282 days.

(21) Appl. No.: 18/197,135

(22) Filed: May 15, 2023

(65) Prior Publication Data
US 2024/0385330 A1 Nov. 21, 2024

(51) Int. Cl.
*G01S 19/07* (2010.01)
(52) U.S. Cl.
CPC .................................. *G01S 19/07* (2013.01)
(58) Field of Classification Search
CPC ....................................................... G01S 19/07
See application file for complete search history.

(56) References Cited

U.S. PATENT DOCUMENTS

| | | | | |
|---|---|---|---|---|
| 7,089,113 | B1* | 8/2006 | Janky | G01S 19/04 701/470 |
| 9,569,745 | B1* | 2/2017 | Ananthanarayanan | G01C 21/343 |
| 10,621,873 | B1* | 4/2020 | Spiel | G06F 16/955 |
| 2014/0043187 | A1* | 2/2014 | Ellum | G01S 19/04 342/357.27 |
| 2016/0234803 | A1* | 8/2016 | Smith | G01S 5/0264 |
| 2017/0331686 | A1* | 11/2017 | Tsai | H04L 5/0085 |
| 2018/0192233 | A1* | 7/2018 | Del Regno | G01S 19/071 |
| 2022/0066042 | A1* | 3/2022 | Rahman | G01S 5/009 |
| 2022/0283314 | A1* | 9/2022 | Luo | G01S 19/07 |
| 2024/0085566 | A1* | 3/2024 | Mobarak | G01S 19/073 |

* cited by examiner

*Primary Examiner* — William Kelleher
*Assistant Examiner* — Hailey R Le (57) ABSTRACT

Disclosed herein is a Real Time Kinematics (RTK) brokering system for distributing RTK positioning data to one or more vehicles, comprising an RTK server adapted to receive positioning data of a plurality of vehicles, dynamically define, based on the positioning data, a plurality of dynamically defined zones each associated with a respective group of vehicles located within borders of the respective dynamically defined zone and contained within a coverage area of one or more RTK base stations, receive RTK positioning correction data relating to each dynamically defined zone from one or more of the RTK base stations covering the respective dynamically defined zone, and distribute the RTK positioning correction data relating to each dynamically defined zone to the respective group of vehicles associated with the respective dynamically defined zone. Wherein one or more of the vehicles computes its location with improved accuracy based on the related RTK positioning correction data.

20 Claims, 5 Drawing Sheets

BROKERING REAL TIME KINEMATICS (RTK) POSITIONING DATA FOR DYNAMICALLY DEFINED ZONES

BACKGROUND

The present invention, in some embodiments thereof, relates to brokering and distributing RTK positioning correction data to vehicles, and, more specifically, but not exclusively, to distributing RTK positioning correction data to a plurality of vehicles grouped in groups associated with dynamically defined zones according to their location.

Localization and positioning of vehicles is a core element for a plurality of vehicle related systems, applications, platforms, and/or capabilities ranging from navigation, through vehicle control to safety and security.

While in most cases traditional positioning means, systems and services such as, for example, Global Navigation Satellite Systems (GNSS) and/or the like may be sufficient, some systems, applications, platforms, and/or services in a plurality of market segments, for example, agriculture, transportation, automotive, and defense may require increased accuracy positioning.

Real-Time Kinematic (RTK) positioning is a significantly more precise and accurate satellite-based positioning technique to determine accurate position of a receiver on Earth's surface with centimeter-level accuracy. In RTK positioning, reference stations, also known as RTK base station, with known coordinates may be used to calculate the errors and biases in the GNSS signal. These errors may be then distributing to roving receivers, mounted on vehicles, which may use the RTK information to correct their own position in real-time.

SUMMARY

It is an object of the present invention to provide, methods, systems and software program products for distributing RTK correction data to groups of vehicles associated with dynamically defined zones to improve their positioning and localization. The foregoing and other objects are achieved by the features of the independent claims. Further implementation forms are apparent from the dependent claims, the description and the figures.

According to a first aspect of the present invention there is provided an RTK brokering system for distributing RTK positioning data to one or more vehicles, comprising one or more RTK servers adapted to:
  Receive positioning data of a plurality of vehicles.
  Dynamically define a plurality of zones based on the positioning data. Each of the plurality of dynamically defined zones is associated with a respective group of vehicles of the plurality of vehicles which are located within borders of the respective dynamically defined zone. Each of the plurality of dynamically defined zones is contained within a coverage area of one or more RTK base stations.
  Receive RTK positioning correction data relating to each dynamically defined zone from the one or more RTK base stations covering the respective dynamically defined zone.
  Distribute the RTK positioning correction data relating to each dynamically defined zone to the respective group of vehicles associated with the respective dynamically defined zone.
  Wherein one or more vehicles of each group of vehicles computes its location with improved accuracy based on the related RTK positioning correction data.

According to a second aspect of the present invention there is provided a method of brokering RTK positioning data to one or more vehicles, comprising using one or more RTK servers for:
  Receiving positioning data of a plurality of vehicles.
  Dynamically defining a plurality of zones based on the positioning data. Each of the plurality of dynamically defined zones is associated with a respective group of vehicles of the plurality of vehicles which are located within borders of the respective dynamically defined zone. Each of the plurality of dynamically defined zones is contained within a coverage area of one or more RTK base stations.
  Receiving RTK positioning correction data relating to each dynamically defined zone from the one or more RTK base stations covering the respective dynamically defined zone.
  Distributing the RTK positioning correction data relating to each dynamically defined zone to the respective group of vehicles associated with the respective dynamically defined zone.
  Wherein one or more vehicles of each group of vehicles computes its location with improved accuracy based on the related RTK positioning correction data.

In a further implementation form of the first, and/or second aspects, the coverage area of each of the one or more RTK base stations defines a respective area in which the improved accuracy location is effectively computed using RTK positioning correction data received from the respective RTK base station.

In a further implementation form of the first, and/or second aspects, the one or more RTK servers are further adapted to adjust the borders of one or more of the plurality of dynamically defined zones according to an adjusted positioning of one or more of the plurality of vehicles.

In an optional implementation form of the first, and/or second aspects, the borders of the plurality of zones are dynamically defined in each time period by minimizing a number of a plurality of closing polygons defining the borders of the plurality of dynamically defined zones, the plurality of closing polygons are computed with respect to the location of active RTK base stations, a location of vehicles requesting RTK positioning correction data, and an accuracy threshold defining a bounded limit of positioning accuracy per each vehicle.

In an optional implementation form of the first, and/or second aspects, the one or more RTK servers are further adapted to:
  Associate each of the plurality of dynamically defined zones with a respective one of a plurality of topics identifying the respective dynamically defined zone.
  Publish RTK positioning correction data relating to each dynamically defined zone correlated with the topic of the respective dynamically defined zone in one or more publish-subscribe services accessible to one or more of the vehicles via one or more networks.
  Wherein each of the one or more vehicles is adapted to:
  Subscribe to one or more of the publish-subscribe services according to the topic associated with the respective dynamically defined zone in which the respective vehicle is located.
  Collect the RTK positioning correction data published for the respective dynamically defined zone under the respective topic.

In a further implementation form of the first, and/or second aspects, one or more of the vehicles determine the respective dynamically defined zone in which they are located according to the positioning data of respective vehicle compared to a plurality of closing polygons defining the borders of a respective one of the plurality of dynamically defined zones. Each of the plurality of topics is correlated with a plurality of closing polygons defining the borders of its associated dynamically defined zone.

In a further implementation form of the first, and/or second aspects, the RTK positioning correction data is received according to one or more NTRIP protocols. NTRIP is abbreviation of networked transport of radio technical commission for maritime services (RTCM) via internet protocol.

In a further implementation form of the first, and/or second aspects, the RTK positioning correction data relating to one or more of the plurality of dynamically defined zones is received from a plurality of RTK base stations covering the respective dynamically defined zone.

In a further implementation form of the first, and/or second aspects, the plurality of RTK base stations are operated by one or more RTK vendors.

In a further implementation form of the first, and/or second aspects, the one or more RTK servers utilize one or more multi-threaded cloud based services adapted to support simultaneously a plurality of vehicles located in the plurality of dynamically defined zones.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to brokering and distributing RTK positioning correction data to vehicles, and, more specifically, but not exclusively, to distributing RTK positioning correction data to a plurality of vehicles grouped in groups associated with dynamically defined zones according to their location.

According to some embodiments of the present invention, there are provided methods, systems and computer program products for brokering and distributing RTK positioning correction data to a plurality of vehicles (rovers) grouped in a plurality of groups each associated with a respective one of a plurality of zones dynamically defined in real-time to include the vehicles of the respective group.

An RTK data broker may be deployed to receive positioning data from each of a plurality of vehicles located in one or more areas which are covered by one or more RTK base stations, i.e., areas in which RTK positioning correction data, interchangeably designated RTK data herein after, received from the RTK bases station(s) may be used to effectively compute an increased accuracy location (positioning).

The positioning data transmitted to the RTK broker by each vehicle, manned, autonomous, and/or partly autonomous, is indicative of location (positioning) of the respective vehicle and may be determined using one or more positioning methods and/or systems having limited accuracy which are deployed in the vehicles, for example, GNSS based positioning and localization, dead-reckoning navigation, and/or the like.

The RTK broker may determine the location of each of the vehicles and may define a plurality of zones each associated with a receptive group of vehicles located with borders of the respective zone. Moreover, since at least some of the vehicles may move and thus change their location, the RTK broker may dynamically define one or more of the zones. i.e., adjust their borders to contain all the vehicles of the associated group according to the new (adjusted) location of dynamic vehicles of the group.

The RTK broker may collect RTK data relating to each of the dynamically defined zones from one or more RTK base station having an RTK coverage zone which contains the respective zone, i.e., RTK base station(s) covering the respective zone. As known in the art, an RTK coverage area of a respective RTK base station may define an area in which satellite signal correction parameters, meet a threshold, for example a minimal threshold for the correction accuracy due to distance of RTK base station from vehicles. RTK data captured by the covering RTK base station may be therefore used to effectively compute improved location in the covered RTK coverage area.

The RTK broker may then distribute the RTK data relating to each of the dynamically defined zones to the vehicles of the respective group associated with the respective dynamically defined zone.

Using the RTK data relating to the dynamically defined zone in which they are located, one or more of the vehicles may compute, as known in the art, its present location with significantly increased accuracy.

Optionally, the RTK broker may distribute RTK data to one or more of the vehicles via one or more publish-subscribe services to which the vehicles may subscribe to monitor RTK data (messages) published by the RTK broker.

Moreover, the RTK broker may create a plurality of topics at the publish-subscribe service(s) each associated with a respective one of the dynamically defined zones. As such, each vehicle may subscribe to one of the topics which is associated with the dynamically defined zone in which the respective vehicle is currently located such that the RTK data published under the selected topic is relevant to the respective vehicle which may use it to compute its improved accuracy location.

Optionally, the RTK broker may dynamically define one or more of the zones according to one or more additional considerations, for example, an affiliation of at least some of the vehicles. For example, the vehicles comprise some agricultural vehicles (e.g., tractors, sprayers, combines, etc.) which belong and/or operated by several farms. In such case, while it is possible to group all the agricultural vehicles together in a single dynamically defined zone, the RTK broker may define several distinct zones each associated with a respective group of agricultural vehicles affiliated with a respective one of the farms. In another example, assuming several different RTK base stations operated by different RTK vendors cover a certain common area. In such case, the RTK broker may define multiple distinct zones for a plurality of vehicles travelling in the common area where each zone may be associated with a receptive RTK vendor.

Deploying an RTK broker to distribute RTK positioning correction data to vehicles grouped in groups associated with zones dynamically defined in real-time to include the vehicles of the associated group may present major benefits and advantages compared to existing RTK distribution methods.

First, in most if not all existing RTK distribution data systems, methods and/or services, each vehicle may directly communicate with one or more RTK base stations covering the current location of the vehicle. This direct vehicle to RTK base station connection may be highly limited in several aspects.

One such limitation stems from the fact that while a vehicle may be located in an RTK coverage area of a certain RTK base station, the vehicle may be unable to directly communicate with the certain RTK base station due to one or more interferences, for example, harsh terrain (e.g., mountains, forest, etc.), electromagnetic interfaces (e.g., power lines, etc.), and/or the like. In contrast, the RTK broker which may be hoisted by one or more servers cloud services, and/or the like may use significantly more robust communication infrastructure, for example, cellular network, Radio Frequency (RF) channels, and/or the like to communicate with the RTK base stations at one end and with the vehicles on the other end. Such robust communication infrastructure(s) which is typically significantly better, more effectively, and/or more densely deployed may be significantly immune to interferences thus establishing a reliable, efficient, and undisturbed communication path from the RTK base stations to the vehicles.

Another limitation of the direct vehicle to RTK base station connection may relate to switching between RTK base stations, i.e., hand-over, when a vehicle travels from one RTK coverage of a first RTK base station to another one covered by a second RTK base station. In such case, the vehicle may need to first learn (determine) that it moved out of coverage of the first RTK base station and into the RTK coverage area of the second RTK base station which may be a complex task for the vehicle followed by a need of the vehicle to establish communication with the second RTK base station. On the other hand, managing the RTK data at the RTK broker and distributing relevant RTK data to each vehicle may relief the vehicles from this effort thus making them oblivious as to where exactly the RTK data is received from, i.e., from which RTK base station(s).

The limitation of vehicles directly communicating with RTK base stations that travel between RTK coverage areas of different RTK base stations may be further increased when the different RTK base stations are operated by different RTK vendors since such vehicles must be subscribed to both RTK vendors in order to receive RTK data from the different RTK base stations. This limitation is also overcome by the RTK broker which is the single entity that needs to subscribe to the different vendors to receive RTK from the respective RTK base stations. The RTK broker may then deliver the RTK data relevant to each vehicle without the vehicle even being aware of which vendor provided the RTK data.

Moreover, dynamically defining the zones and adjusting their borders in real-time such that each dynamically defining the zone always contains all vehicles of its associated group of vehicles may eliminate the need to constantly map each vehicle individually to determine which RTK data should be delivered to it, i.e., from which RTK base station to fetch RTK data for each vehicle. Dynamically defining the zones may allow the RTK broker to group the vehicles in maintainable groups which may be fixed even when the vehicle dynamically move and change their location thus simplifying the mapping of the vehicles to corresponding RTK base stations. This limitation may be even more apparent in a publish-subscribe architecture where each vehicle should subscribe to a certain topic to monitor and collect its RTK data messages. As opposed to individually tracking each vehicle, the RTK maintaining fixed groups of vehicles may publish, to each group, relevant RTK data under a fixed topic correlated with the dynamically defined zone associated with the group even when vehicles of the group change their location.

Furthermore, the RTK brokering architecture may ensure robust, continuous and uninterrupted RTK service to the vehicles. For example, in scenarios when one or more RTK base stations operated by a specific RTK vendor are unavailable due to one or more external reasons (e.g., malfunction, fire, etc.), the RTK broker may transition to another RTK vendor, standing as fallback, to receive RTK data from one or more of the other vendor's RTK base stations covering the same area as the unavailable RTK base station(s) and distribute the RTK data to vehicles located in this area.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
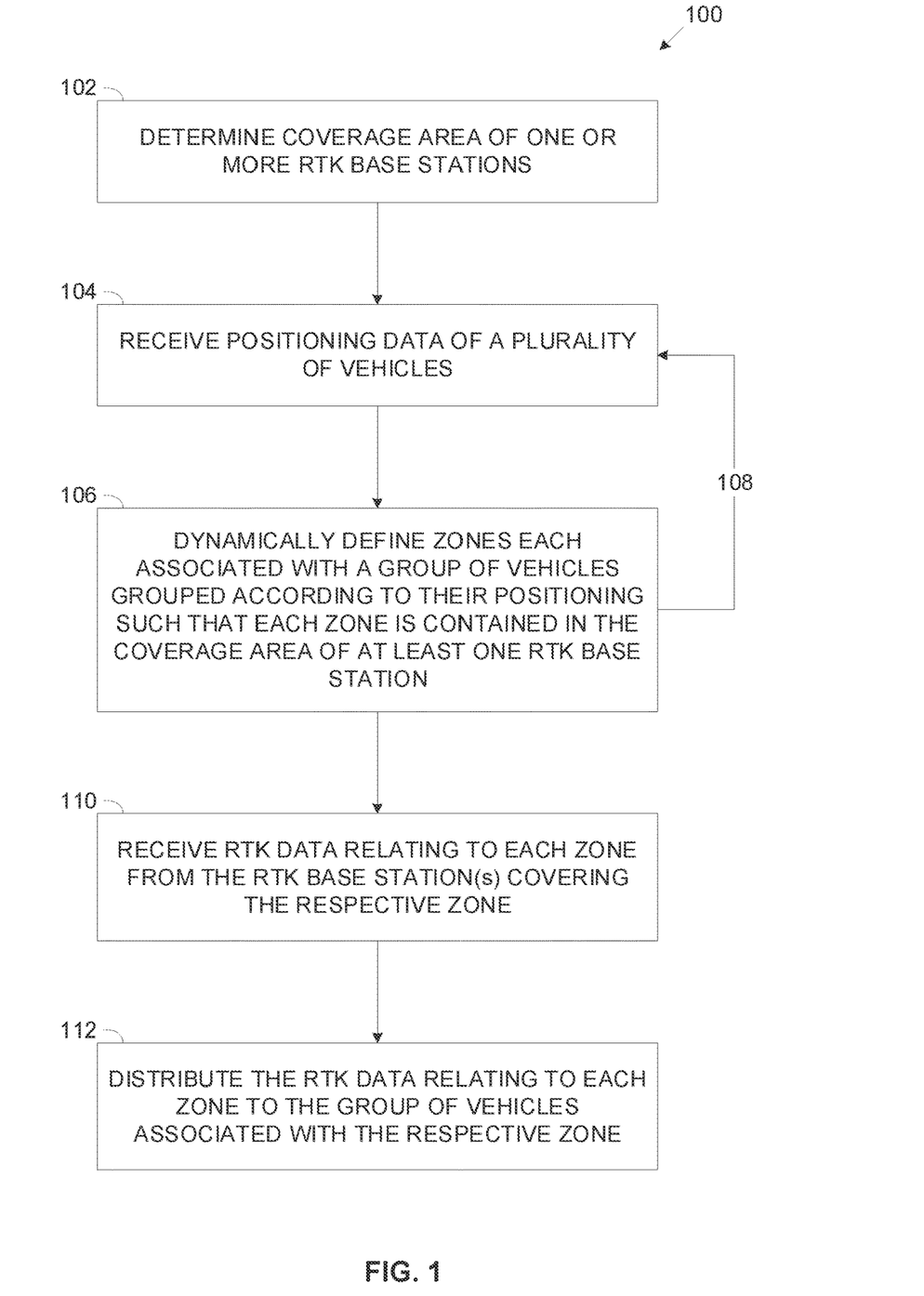
FIG. 1 is a flowchart of an exemplary process of distributing RTK positioning correction data to vehicles grouped in dynamically defined zones according to their location, according to some embodiments of the present invention.

Referring now to the drawings, FIG. 1 is a flowchart of an exemplary process of distributing RTK positioning correction data to vehicles grouped in dynamically defined zones according to their location, according to some embodiments of the present invention.

An exemplary process 100 may be executed by an RTK broker to distribute RTK positioning correction data, interchangeably designated RTK data or RTK data, received from one or more RTK base stations to a plurality of vehicles which may use the RTK positioning correction data to improve accuracy of their location. It should be noted that the actual usage of RTK positioning correction data to improve localization (positioning) accuracy is beyond the scope of this disclosure.

In particular, the plurality of vehicles may be grouped into a plurality of groups according to their location and each group may be associated with a respective zone which is defined to include the group of vehicles. As such, one or more of the zones may be dynamically defined and have its borders adjusted according to movement and change in the location of one or more vehicles of its associated group.

Each of the dynamically defined zones may be contained in an RTK coverage range of at least one RTK based station. Specifically, each of the dynamically defined zones may be completely (entirely) contained in the coverage range of at least one RTK based station.

The RTK broker may therefore distribute to each group of vehicles the RTK positioning correction data received from the RTK base station covering the zone associated with the respective group.

Figure 2:
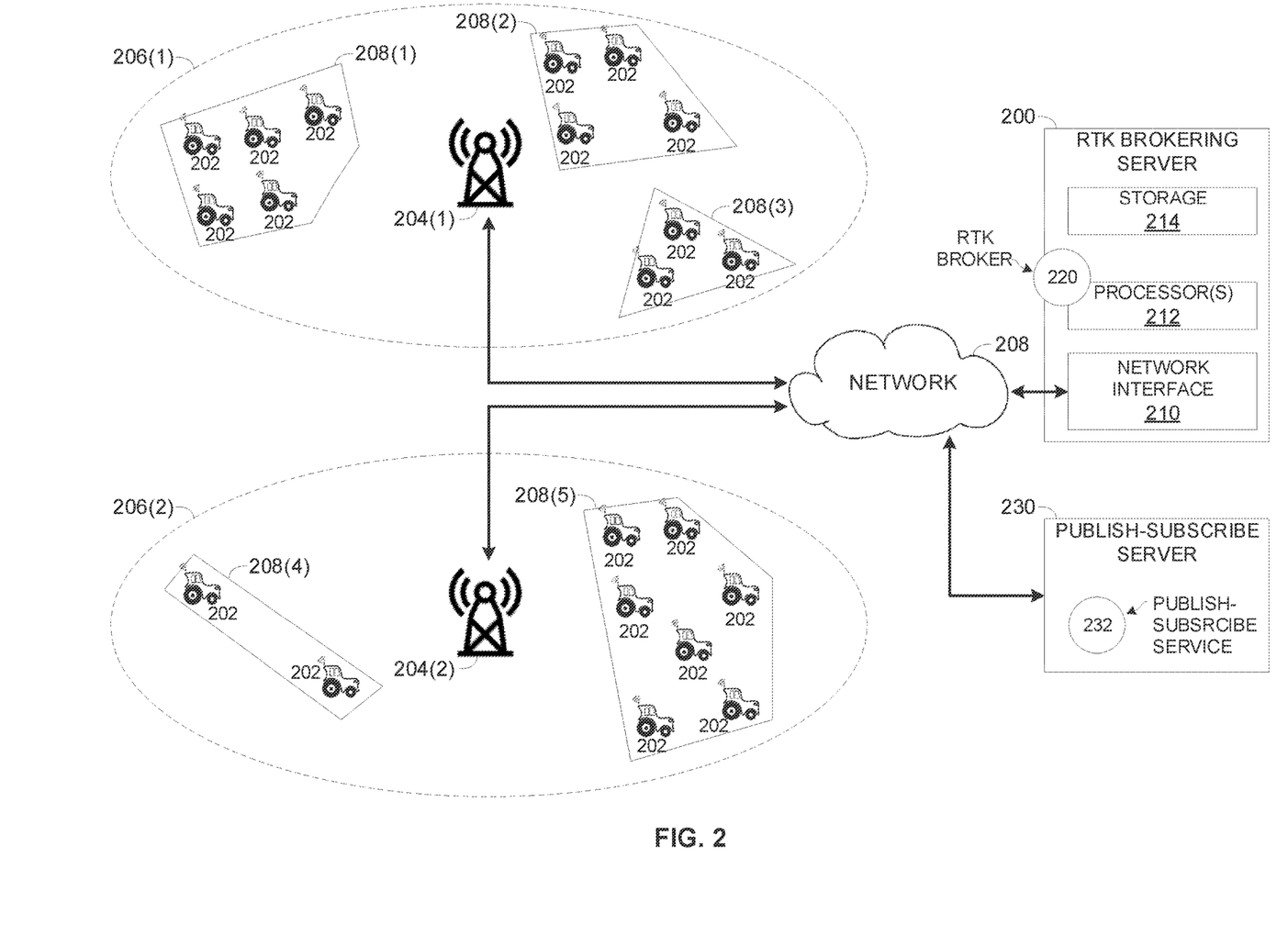
FIG. 2 is a schematic illustration of an exemplary system for distributing RTK positioning correction data to vehicles grouped in dynamically defined zones according to their location, according to some embodiments of the present invention.

Reference is also made to FIG. 2, which is a schematic illustration of an exemplary system for distributing RTK data to vehicles grouped in dynamically defined zones according to their location, according to some embodiments of the present invention.

An RTK brokering server 200, for example, a computer, a server, a computing node, a cluster of computing nodes and/or another processing device may be adapted to distribute RTK data to a plurality of vehicles 202 located in a plurality of areas covered by one or more RTK base stations 204.

Each RTK base station 204 may have a respective RTK coverage area 206, for example, a coverage area 206(1) of an RTK base station 204(1), a coverage area 206(2) of an RTK base station 204(2), and/or the like. The RTK coverage area 206 of each RTK base station 204 is characterized by having substantially similar satellite signal reception parameters, for example, timing, angle, and/or the like and may therefore define a respective area in which improved accuracy location may be effectively computed using RTK data received from the respective at least one RTK base station 204.

Defining, determining and/or otherwise establishing the coverage range of each RTK base station 204 is out of scope of the present disclosure and as known in the art may depend on a plurality of conditions, parameters, characteristics and/or attributes, for example, location of the respective RTK base station 204, its surrounding terrain, a satellite coverage, and/or the like.

The RTK brokering server 200 may be deployed to support vehicles 202 located in a plurality of distinct area often located significantly far from each other and since the coverage area 206 of each RTK base station 204 may be limited, for example, 10 kilometers, 20 kilometers, 30 kilometers, and/or the like, the RTK brokering server 200 may collect RTK data from a plurality of RTK base stations 204 operated by one or more RTK vendors (e.g., owners, operators, etc.) which jointly cover the area in which the plurality of vehicles 202 are located.

The RTK brokering server 200 may receive the RTK data from each of one or more RTK base stations 204 via a network 208 comprising one or more wired and/or wireless networks, for example, a Local Area Network (LAN), a Wide Area Network (WAN), a Metropolitan Area Network (MAN), a Wireless LAN (WLAN), a cellular network, the internet and/or the like.

Each of the vehicles 202 which may be manned, autonomous, and/or partially autonomous may have network connectivity, typically wireless network connectivity, for example, Wireless LAN, cellular, Radio Frequency (RF), and/or the like such that each vehicle may connect to one or more networks, for example, the network 208.

Each of the vehicles 202 may comprise one or more computing units, for example, a processor, a controller, an Electronic Control Unit (ECU), and/or the like adapted to execute an RTK agent adapted to communicate, via the network 208, with one or more remote network resources, for example, the RTK brokering server 200 to receive RTK data relating to their present (current) location. It should be noted that while sometimes a vehicle 202 is described to communicate and interact with the RTK brokering server 200, this communication and interaction is actually done by the RTK agent executed by the respective vehicle 200.

The plurality of vehicles 202 may comprise one or more types of vehicles serving one or more applications, tasks, mission, and/or operations. For example, the vehicles 202 may comprise one or more agricultural vehicles, for example, a tractor, a harvester, a sprayer, a combine, a pickup machine, and/or the like deployed and operated to conduct one or more agriculture operations in one or more agriculture areas, for example, a field, an orchard, a vineyard, a fishpond, and/or the like. In another example, the vehicles 202 may comprise one or more transportation vehicles operated to carry people and/or goods, for example, a car, a bus, a bicycle, a truck, a cart, and/or the like in one or more areas, for example, urban area, countryside, open nature, and/or the like.

The RTK brokering server 200 may define a plurality of zones 208 each associated with a group of vehicles 202 located in the respective zone 208. For example, the RTK brokering server 200 may define a first zone 208(1), a second zone 208(2), and a third zone 208(1) in the coverage area 206(1) of the RTK base station 204(1) where zone 208(1) is associated with a group of five vehicles 202 located in it, the zone 208(2) is associated with a group of four vehicles 202 located in it, and the zone 208(3) is associated with a group of three vehicles 202 located in it. In another example, the RTK brokering server 200 may define a fourth zone 208(4), and a fifth zone 208(5) in the coverage area 206(2) of the RTK base station 204(2) where zone 208(4) is associated with a group of two vehicles 202 located in it, and the zone 208(5) is associated with a group of seven vehicles 202 located in it.

In particular, as described in further detail herein after, the RTK brokering server 200 may dynamically define one or more of the zones 208 according to changes and adjustments in the location of the vehicles 202.

The RTK brokering server 200 may comprise a network interface 210, a processor(s) 212 for executing the process 100 to distribute RTK data to the vehicles 202, and a storage 214 for storing code (program store) and/or data.

The network interface 210 may include one or more wired and/or wireless network interfaces for connecting to the network 208 to facilitate communication with the RTK base stations 204 and the vehicle 202.

The processor(s) 212, homogeneous or heterogeneous, may include one or more processing nodes and/or cores arranged for parallel processing, as clusters and/or as one or more multi core processor(s).

The storage 214 may include one or more non-transitory persistent storage devices, for example, a Read Only Memory (ROM), a Flash array, a Solid State Drive (SSD), a hard drive (HDD) and/or the like. The storage 214 may also include one or more volatile memory devices, for example, a Random Access Memory (RAM) component, a cache and/or the like. The storage 214 may further comprise one or more network storage devices, for example, a storage server, a Network Accessible Storage (NAS), a network drive, a database server and/or the like accessible through the network interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212.

The processor(s) 212 may further include, integrate and/or utilize one or more hardware modules available in the RTK brokering server 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), a network processor, an Artificial Intelligence (AI) accelerator and/or the like.

As such, the processor(s) 212 may execute one or more functional modules which may be utilized by one or more software modules, one or more of the hardware modules and/or a combination thereof. For example, the processor(s) 212 may execute an RTK broker 220 functional module for executing the process 100. It should be noted that the process 100 and/or part thereof may be executed by one or more of the processors of the processor(s) 212 if it comprises multiple processors. However, it is possible that one or more of such a multi-processor processor(s) 212 may not participate at all in the execution of the process 100.

Optionally, the RTK brokering server 200, specifically the RTK broker 220 may be provided, executed and/or utilized at least partially by one or more cloud computing services, for example, Infrastructure as a Service (IaaS), Platform as a Service (PaaS), Software as a Service (SaaS), and/or the like provided by one or more cloud services, cloud infrastructures, and/or the like such as, for example, Google Cloud, Microsoft Azure, Amazon Web Service (AWS) and Elastic Compute Cloud (EC2), IBM Cloud, and/or the like.

Moreover, RTK brokering server 200, and/or the RTK broker 220 may utilize one or more multi-threaded cloud-based services adapted to support simultaneously a plurality of vehicles 202 located in the plurality of dynamically defined zones 208. This means that a plurality of groups of vehicles 202 each associated with a different one of the plurality of dynamically defined zones 208 may be simultaneously served with RTK positioning correction data received from respective RTK base station(s) 204.

Optionally, the RTK brokering server 200, specifically the RTK broker 220 may distribute RTK positioning correction data to one or more of the vehicles 202 via one or more publish-subscribe (Pub-Sub) servers 230, for example, a system, a platform, a service, and/or the like which is in communication with the RTK brokering server 200 via one or more networks, for example, the network 208.

The publish-subscribe system(s) 230 may host and/or provide one or more publish-subscribe services 232 in which the RTK broker 220 may publish RTK data collected from the RTK base stations 204 and to which one or more vehicles 202 may subscribe to collect RTK data relevant to their current location.

The publish-subscribe service may employ one or more messaging protocols as known in the art, for example, MQ Telemetry Transport (MQTT), Advanced Message Queuing Protocol (AMQP), and/or the like which the vehicle(s) 202 may use to collect RTK data.

As shown at 102, the RTK broker 220 may determine a coverage area 206 of each of one or more RTK base stations 204 deployed in one or more areas.

The RTK broker 220 may determine the coverage area 206 of each of one or more RTK base stations 204 based on one or more conditions, parameters, characteristics and/or attributes relating to the location of the respective RTK base station 204, for example, positioning (coordinates), elevation, and/or the like, its surrounding terrain, satellite coverage, and/or the like. However, as stated herein before, determining the coverage area 206 of each RTK base station 204 is beyond the scope of the present disclosure.

In another example, the RTK broker 220 may extract the coverage area 206 of each of one or more RTK base stations 204 from one or more coverage records, for example, a database, a map, a table, a list, and/or the like mapping the coverage area 206 of the respective RTK base station 204. Such coverage records may be locally stored at the RTK brokering server 200, for example, in the storage 214, and/or received from one or more remote networked resources, for example, a database, and/or the like connected to the network 202.

As shown at 104, the RTK broker 220 may receive positioning data of a plurality of vehicles 202 transmitted from the vehicles 202 via one or more networks, for example, the network 208.

One or more of the vehicles 202 may communicate directly with the RTK broker 220 via the network 208. However, one or more of the vehicles 202 may transmit their positioning data to one or more $3^{rd}$ systems, platforms, services and/or the like connected to the network 208 accessible to the RTK broker 220 which may therefore collect the positioning data of these vehicles 202 from the $3^{rd}$ systems, platforms, and/or services.

Each vehicle 202, specifically, one or more computing units deployed in the vehicle 202, for example, a processor, a processing circuit, a logic circuit, an Electronic Control Unit (ECU) and/or the like may apply one or more methods, techniques, and/or algorithms to compute, generate, and/or receive its positioning data. For example, one or more vehicles 202 may compute their positioning data based on positioning information received from one or more positioning sensors deployed in the vehicle 202 and adapted to generate positioning data based on one or more GNSS services, for example, Global Positioning System (GPS), Global Navigation Satellite System (GLONASS), Galileo, and/or the like. In another example, one or more vehicles 202 may compute their positioning data based on dead-reckoning navigation data generated by one or more navigation systems deployed in the vehicle 202 which may compute a location of the vehicle based on motion data captured by one or more motion sensors of the vehicle 202, for example, an Inertial Measurement Unit (IMU), an accelerometer, a gyroscope, and/or the like.

As shown at 106, the RTK broker 220 may define one or more zones 208 based on the positioning data of the vehicles 202 such that each of the zones 208 is associated with a respective group of vehicles 202 which are located within the respective zone 208.

In particular, as seen in 108, the RTK broker 220 may receive updated positioning data from one or more of the vehicles 202 and may adjust in real-time one or more of the zones 208 meaning that the RTK broker 220 may dynamically adjust the zones 208 according to a current location of the plurality of vehicles 202 as reflected by the updated positioning data from the vehicles 202.

Moreover, the RTK broker 220 may dynamically define the plurality of zones 208 in real-time according to the coverage areas 206 of the RTK base stations 204 such that each of the dynamically defined zones 208 is contained within the coverage area 206 of at least one RTK base station 204. Specifically, each dynamically defined zone 208 may be completely contained with the coverage area 206 of at least one RTK base station 204. This means that a zone 208 may not be split between coverage areas 206 of multiple different RTK base stations 204.

However, in case the coverage areas 206 of two or more different RTK base stations 204 overlap, the RTK broker may define one or more dynamically defined zones 208 within the overlapping area such that RTK positioning correction data received from the two RTK base stations 204 may relate to the same dynamically defined zone 208 contained in the overlapping area.

Adapting the RTK broker 220 to define the zones 208 such that each zone 208 is completely contained in the coverage area 206 of at least one RTK base station 204 is done to ensure that all vehicles 202 of the group associated with the respective zone 208 will receive and use RTK data received from an RTK base station 204 having a coverage area 206 encompassing all vehicles 202 of the respective group. In other words this prevents scenarios in which not all vehicles 202 of a respective group are located in the same coverage area 206 and may this incorrectly use irrelevant RTK data received from an RTK base station 204 that is not covering one or more vehicles 202 of the respective group.

Optionally, the RTK broker 220 may define one or more zones 208 according to one or more further considerations, which may relate to one or more of the vehicles 202 and/or one or more of the RTK base stations 204. For example, the RTK broker 220 may define one or more zones 208 according to an affiliation of at least some of the vehicles 202.

For example, assuming some of the vehicles 202, for example, agricultural vehicles, which are located in a certain area covered by a certain RTK based station 204 belong and/or operated by several farms, for example, three different farms. In such case, while it is possible to group all the agricultural vehicles 202 together as they are all covered by a common RTK base station 204, the RTK broker 220 may define several distinct zones 208, for example, three zones 208 each associated with a respective group of agricultural vehicles 202 affiliated with a respective one of the three farms. In another example, assuming a plurality of transportation vehicles 202 (e.g., buses, autonomous taxis, etc.) are operated in a certain common urban area by multiple operators. In such case, the RTK broker 220 may define multiple distinct zones 208 each associated with a group of transportation vehicles 202 operated by a respective one of the operators.

In another example, assuming several different RTK base stations 204 operated by different RTK vendors all cover a certain common area. In such case, the RTK broker 220 may define multiple distinct zones 208 for a plurality of vehicles 202 travelling in the common area where each zone 208 may be associated with a receptive RTK vendor.

Figure 3A:
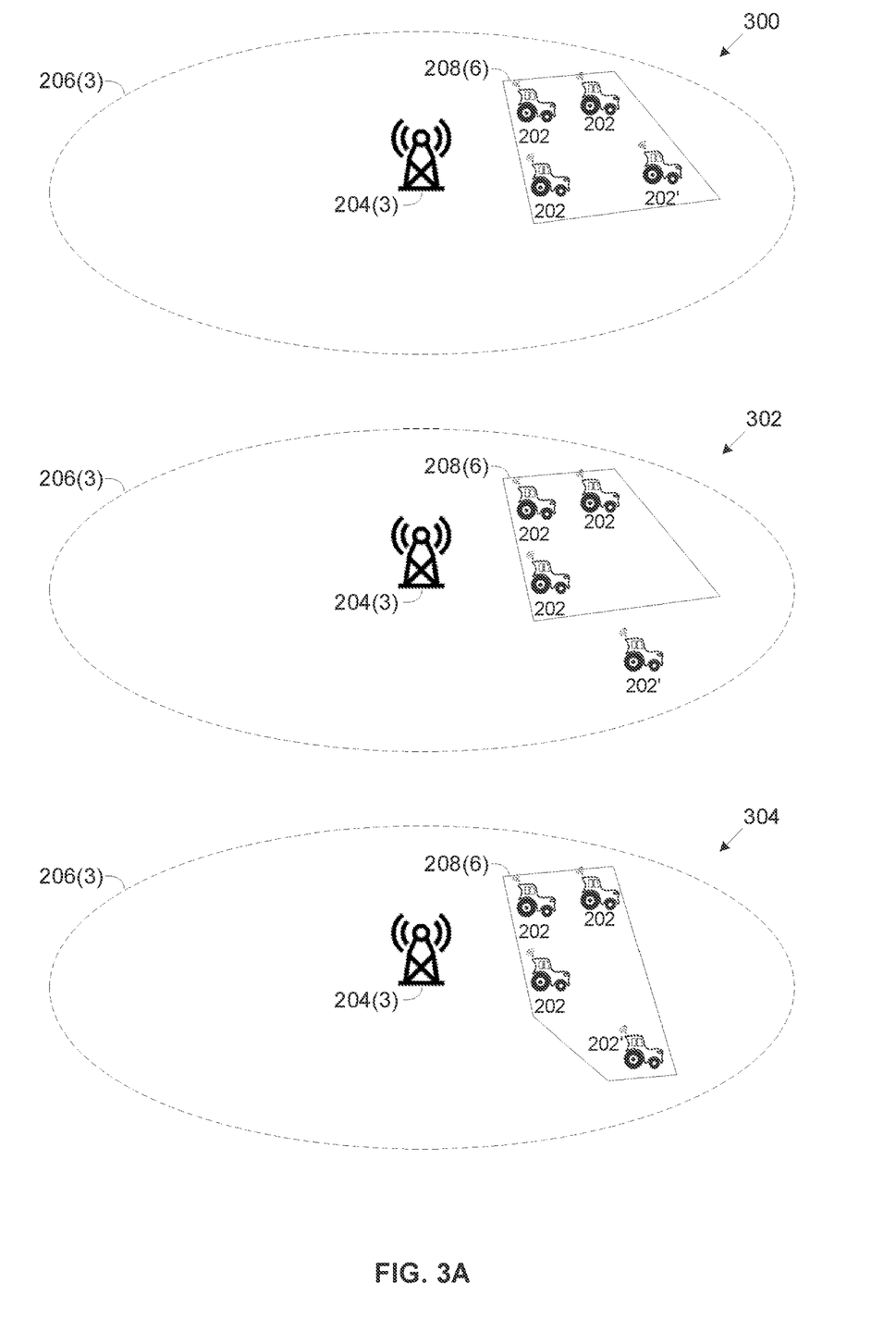
FIG. 3A and FIG. 3B are schematic illustrations of dynamically adjusting zones according to location of corresponding groups of vehicles, according to some embodiments of the present invention.
Figure 3B:
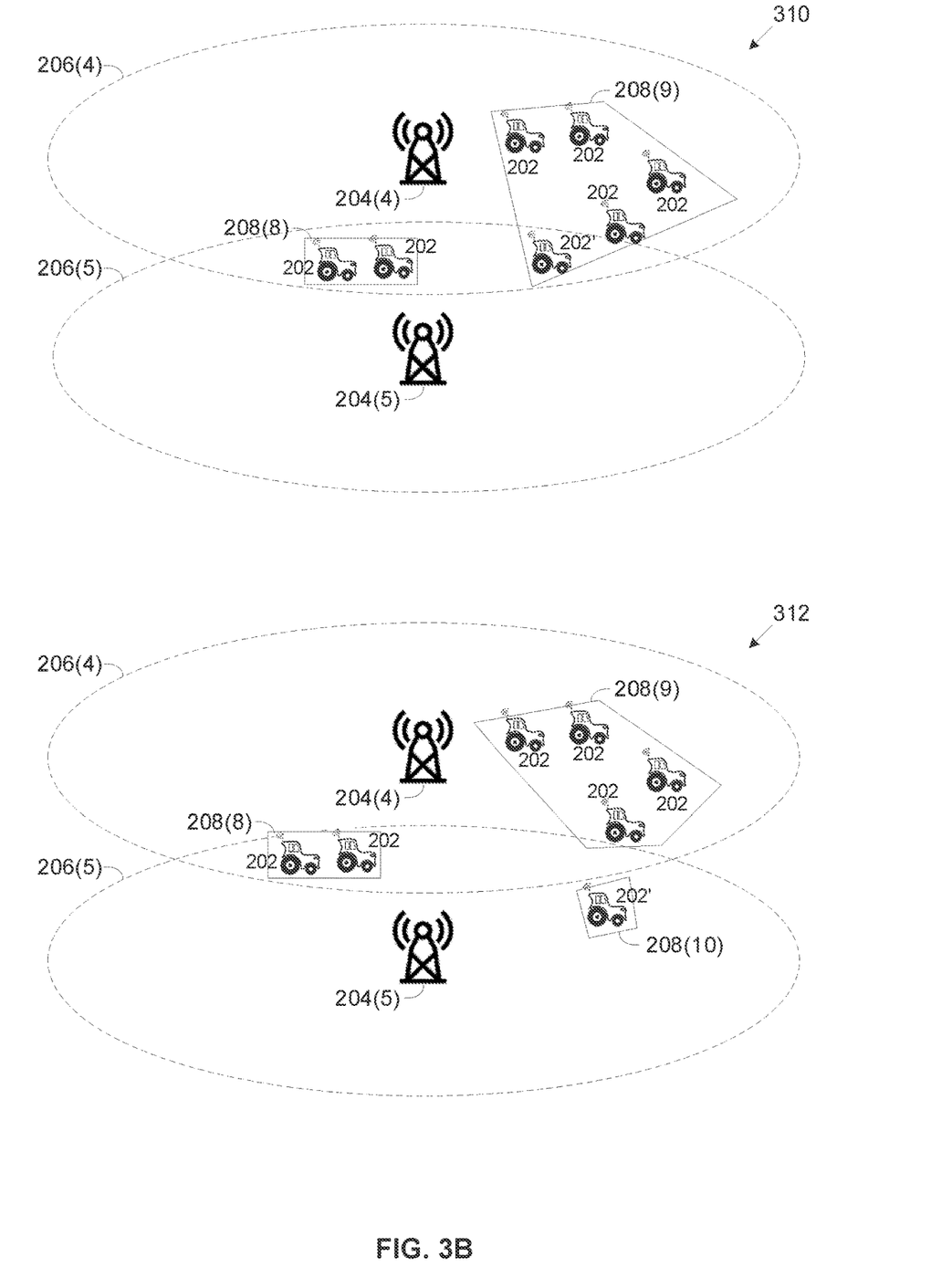

Reference is now made to FIG. 3A and FIG. 3B, which are schematic illustrations of dynamically adjusting zones according to location of corresponding groups of vehicles, according to some embodiments of the present invention.

As seen in illustration 300, an RTK broker such as the RTK broker 220 may define a certain zone 208(6) such as the zone 208 and associate the certain zone 208(6) with a group of four vehicles such as the vehicles 202 which are located within the zone 208(6). In particular, the RTK broker 220 may define the zone 208(6) according to the location of the vehicles 202 which is determined based on positioning data received from the vehicles and a coverage area 206(3) such as the coverage area 206 of an RTK base station 204(3) such as the RTK base station 204 such that the dynamically defined zone 208(6) is contained in the coverage area 206.

As seen in illustration 302, one of the vehicle 202, designated vehicle 202', may move and thus change its location.

As seen in illustration 304, in response to the change of the vehicle 202', the RTK broker 220 may dynamically adjust the dynamically defined zone 208(6), for example, extend and/or stretch it to contains the vehicle 202' in its adjusted location.

As seen in illustration 310, a coverage area 206(4) of an RTK base station 204(4) may partially overlap with a coverage area 206(5) of an RTK base station 204(5). As such, the RTK broker 220 may define a zone 208(7) associated with a group of two vehicle 202 located in the overlapping area, which is completely contained in both the coverage area 206(4) and the coverage area 206(5). In such case, RTK data received from one or both of the RTK base stations 204(4) and 204(5) may be relevant and used by the vehicle 202 of the group 208(7).

Moreover, as seen in illustration 310, the RTK broker 220 may define a zone 208(8) associated with a group of five vehicles 202. As seen, while the vehicle 202' is located in the overlapping area of the coverage areas 206(4) and 206(5) it may be still part of the group because all of the vehicles 202 of the group are within the coverage area 206(4) and may therefore effectively use RTK data received from the RTK base station 204(1).

However, as seen in 312, the vehicle 202' changed its location and has traveled out of the coverage area 206(4) such that it is now located in a place in the coverage area 206(5) which is covered only by the RTK base station 204(5). In response to the adjusted location of the vehicle 202', the RTK broker 220 may therefore dynamically adjust, i.e., dynamically define, the zone 208(9). In particularly, the RTK broker 220 may adjust the zone 208(9) and associate it with a first group of four vehicle 202 located within the coverage area 206(4). The RTK broker 220 may further define a new zone 208(10) contained in the coverage area 206(5) and associate with a group comprising the vehicle 202'.

The RTK broker 220 may dynamically define the plurality of zones 208 in real-time by defining borders of each zone 208 as a plurality of closing polygons, as seen in FIG. 2. For example, the zones 208(1) and 208(5) may be each defined by five respective polygons expressing their borders, the zones 208(2) and 208(4) may be each defined by four respective polygons expressing their borders, and the zone 208(3) may be defined by three polygons expressing its borders.

Accordingly, the RTK broker 220 may dynamically define one or more of the plurality borders of each of one or more of the zones 208 by adjusting the polygons expressing the borders of the respective zone 208 such that in each time period the vehicles 202 of the group associated with the respective zone 208 are contained and located in the respective zone 208.

The time period or time interval applied by the RTK broker 220 for dynamically defining the zones 208 and adjusting the closing polygons defining their borders may be set and/or predefined according to a frequency of receiving updated positioning data from the vehicles 202, for example, 100 milliseconds, a second, five seconds, 30 seconds, a minute, and/or the like. The zones adjustment time period may be further affected by one or more mission and/or scenario dynamics and considerations, for example, different levels of accuracy needed to complete a mission, other characteristics affected by frequency of a defined accurate correction and/or the like.

However, the RTK broker 220 may further adapt, adjust, an d/or select the zones update time period according to one or more operational parameters. For example, the time period may be derived from a criticality of the mission executed by one or more vehicles 202. For example, a critical mission which involves people safety, for example may require increased update frequency and the update time period may be therefore reduced compared to a non-critical mission for which a longer update time period may be selected. In another example, the update time period may be reduced for higher speed and fast moving vehicles 202 in order to increase the update frequency while an increased update time period may be selected for slower moving vehicles 202.

Optionally, the RTK broker 220 may dynamically define and adjust one or more of the plurality borders of each of one or more of the zones 208 by minimizing the number of the plurality of closing polygons defining the borders of the plurality of dynamically defined zones 208. The RTK broker 220 may minimize the number of closing polygons defining the borders of one or more of the dynamically defined zones 208 according to one or more parameters, criteria, constraints and/or a combination thereof.

For example, the RTK broker 220 may minimize the number of closing polygons of one or more zones 208 according to one or more geometric considerations derived from the location of active RTK base stations 204 from which RTK data may be received and according to the location of vehicles 202 requesting such RTK data. As such, the RTK broker 220 may analyze the location of the vehicles 202 with respect to the RTK base stations 204 and dynamically define accordingly the plurality of zones 208 such that the number of closing polygons expressing the birders of the zones 208 is reduced.

In another example, the RTK broker 220 may adjust the closing polygons defining the borders of one or more of the zones 208 according to an accuracy threshold defining a bounded limit of positioning accuracy defined for at least one of the plurality of vehicles 202. For example, assuming two high-speed vehicle 202 and three other slower vehicles 202 are located in a certain area covered by a certain RTK base station 204. In such case, rather than defining a single dynamically defined zone 208 comprising all five vehicles 202, the RTK broker may define two separate dynamically defined zones 208, a first zone 208 associated with a first group comprising the two fast vehicles 202 and a second zone 208 associated with a second group comprising the two three slower vehicles 202. In such case, the accuracy threshold defined for the first group comprising the high-speed fast moving vehicles 202 may be significantly higher than the accuracy threshold defined for the second group comprising the slow vehicles 202.

As shown at 110, the RTK broker 220 may receive RTK positioning correction data relating to each of the plurality of dynamically defined zones 208 from one or more RTK base stations 204 covering the respective dynamically defined zone 208. This means that for each dynamically defined zone 208, the RTK broker 220 may receive RTK data from one or more RTK base stations 204 containing the entire respective dynamically defined zone 208.

For example, in case a certain dynamically defined zone 208 is completely contained in the coverage area 206 of a single RTK base station 204, the RTK data relating to the certain zone 208 may be received from the single RTK base station 204. Such deployment may be demonstrated by zone 208(6) in FIG. 3A which is completely contained in a single coverage area 206 of a single RTK base station 204, namely the coverage area 206(3) of the RTK base station 204(3), and the RTK data relating to the zone 208(6) may be therefore received only from RTK base station 204(3).

In another example, in case a certain dynamically defined zone 208 is completely contained in the coverage area 206 of multiple RTK base stations 204, the RTK data relating to the certain zone 208 may be received from the multiple RTK base stations 204. Such a deployment may be demonstrated by zone 208(8) in FIG. 3B which is completely contained in a the coverage area 206 of two RTK base stations 204, namely the coverage area 206(4) of the RTK base station 204(4) and the coverage area 206(5) of the RTK base station 204(5), and the RTK data relating to the zone 208(8) may be therefore received only from RTK base station 204(3).

The RTK broker 220 may employ one or more positioning data streaming protocols for communicating with the RTK base stations 204 to receive their RTK data, for example, Networked Transport Of Radio Technical Commission For Maritime Services (RTCM) via Internet Protocol (NTRIP), and/or the like.

As shown at 112, the RTK broker 220 may distribute the RTK positioning correction data to the vehicles 202. In particular, the RTK broker 220 may distribute the RTK positioning correction data relating to each dynamically defined zone 208 to the respective group of vehicles 202 associated with the respective dynamically defined zone 208.

Specifically, the RTK broker 220 may distribute the RTK data to the RTK agents executed by the vehicles 202.

One or more of the vehicles 202 may then use the received RTK positioning correction data, as known in the art, to improve and/or increase accuracy of their present (current) location, for example, positioning, localization, elevation, and/or the like. Improving the location accuracy may be done at one or more of the vehicles 202, for example, by their respective RTK agent itself. In another example, at one or more of the vehicles 202, the RTK agent may forward, transmit, and/or otherwise provide the received RTK data to one or more applications executed by the respective vehicle 202, for example, a navigation application, a positioning application, and/or the like adapted to compute an improved location using the RTK positioning correction data.

The RTK broker 220 may apply one or more methods, protocols, and/or services to distribute the RTK positioning correction data to the vehicles 202.

For example, the RTK broker 220 may directly transmit respective RTK positioning correction data to one or more of vehicles 202, for example, via the network 208. In another example, the RTK broker 220 may transmit at least some of the RTK positioning correction data to one or more $3^{rd}$ services, platform, system, and/or the like, for example, via the network 208, which may be adapted to deliver the RTK data to one or more vehicles 202.

According to some embodiments, the RTK broker 220 may deliver respective RTK positioning correction data to one or more of vehicles 202 via one or more publish-subscribe (Pub-Sub) servers 230 hosting which may communicate with the RTK brokering server 200 via one or more networks, for example, the network 208. The RTK broker 220 may publish the RTK data collected from the RTK base stations 204 and/or part thereof on one or more publish-subscribe services 232 hosted and/or provided by the Pub-Sub server(s) 230 such that one or more of the vehicles 202 subscribed to the publish-subscribe service(s) 232 may collect their respective RTK data.

In such embodiments, the RTK broker 220 may associate one or more of the plurality of dynamically defined zones 208 with a respective one of a plurality of topics created at the publish-subscribe service 232, for example, MQTT, AMQP, and/or the like, such that each topic identifies a respective dynamically defined zone 208. For example, one or more of the topics may express the borders of their associated zones 208. For example, one or more of the topics may be correlated with the closing polygons defining the borders of their associated dynamically defined zones 208. In another example, one or more of the topics may express coordinates, for example, vertices coordinates of their associated zones 208.

In another example, one or more of the topics may state and/or reflect respective identifiers (IDs) assigned to their associated dynamically defined zones 208 to uniquely identify each zone 208.

For example, assuming the exemplary deployment of vehicles 202 described in FIG. 2, where the RTK broker 220 may dynamically define three exemplary zones 208 namely zones 208(1), 208(2) and 208(3) in the coverage area 206(1) od the RTK base station 204(1). In such case, the RTK broker 220 may create or cause creation of three topics at the publish-subscribe service 232, for example, topic(s), topic(2) and topic(s), and associate each topic with a respective one of the zones 208, for example, topic(1) with zone 208(1), topic(2) with zone 208(2), and topic(3) with zone 208(3).

The RTK broker 220 may then constantly, periodically and/or on-command publish, at the publish-subscribe service 232, RTK positioning correction data relating to one or more of the dynamically defined zones 208 in correlation with the topic associated with the respective dynamically defined zone 208.

For example, continuing the example of FIG. 2, the RTK broker 220 may RTK publish positioning correction data relating to the zones 208(1), 208(2) and 208(3) which is received from the RTK base station 204(1) in correlation with the topics associated with the zones 208(1), 208(2) and 208(3), namely topic(1), topic(2), and topic(3).

One or more of the vehicles 202, specifically the RTK agent executed by the vehicle(s) 202 may subscribe to the publish-subscribe service 232, specifically to one of the plurality of topics associated with the dynamically defined zone 208 in which the respective vehicle 202 is located. The vehicles 202 may apply one or more methods, techniques and/or algorithms to select the topic to which they subscribe at the publish-subscribe service 232.

For example, each of one or more vehicles 202 may determine its current (present) location, for example, using GNSS based positioning, dead-reckoning navigation, and/or the like and may select a topic expressing the borders of an associated zone 208 which contains the current location of the respective vehicle 202. For example, one or more vehicles 202 may compare their positioning data the plurality of closing polygons expressed by one or more of the topic which define their associated dynamically defined zones 208 to determine the zone 208 which contains their current location derived from their positioning data.

In another example, each of one or more vehicles 202 may select a topic according to its unique ID which may be indicative of its associated zone 208. For example, assuming again the exemplary deployment of vehicles 202 described in FIG. 2, in which each of the dynamically defined zones 208(1), 208(2) and 208(3) is associated with a respective one of three farms which each of the farms operates one or more vehicles 202, specifically, agricultural vehicles, for example, tractors in a respective agricultural area.

In such case, a first topic(1) associated with the zone 208(1) may comprise, reflect, and/or otherwise express an identifier (ID) of a first farm having the agricultural area containing the zone 208(1), a second topic(2) associated with the zone 208(1) may comprise, reflect, and/or otherwise express an ID of a second farm having the agricultural area containing the zone 208(2), and a third topic(3) associated with the zone 208(3) may comprise, reflect, and/or otherwise express an ID of a third farm having the agricultural area containing the zone 208(3). Each of the tractors 202 operated by one of the three farms may thus subscribe to the topic associated with its farm according to the ID of its operating farm. For example, one or more tractors 202 operated by farm (1) may subscribe to topic(1) associated with the zone 208(1) located in the agricultural area of farm (1), one or more tractors 202 operated by farm (2) may subscribe to topic(2) associated with the zone 208(2) located in the agricultural area of farm (2), and one or more tractors 202 operated by farm (3) may subscribe to topic(3) associated with the zone 208(3) located in the agricultural area of farm (3).

Each vehicle 202, specifically the RTK agent executed by the vehicle 202, subscribed to the publish-subscribe service 232 may then monitor and collect RTK positioning correction data published under the topic to which it is subscribed and may use the RTK data to compute its location with improved accuracy.

Figure 4:
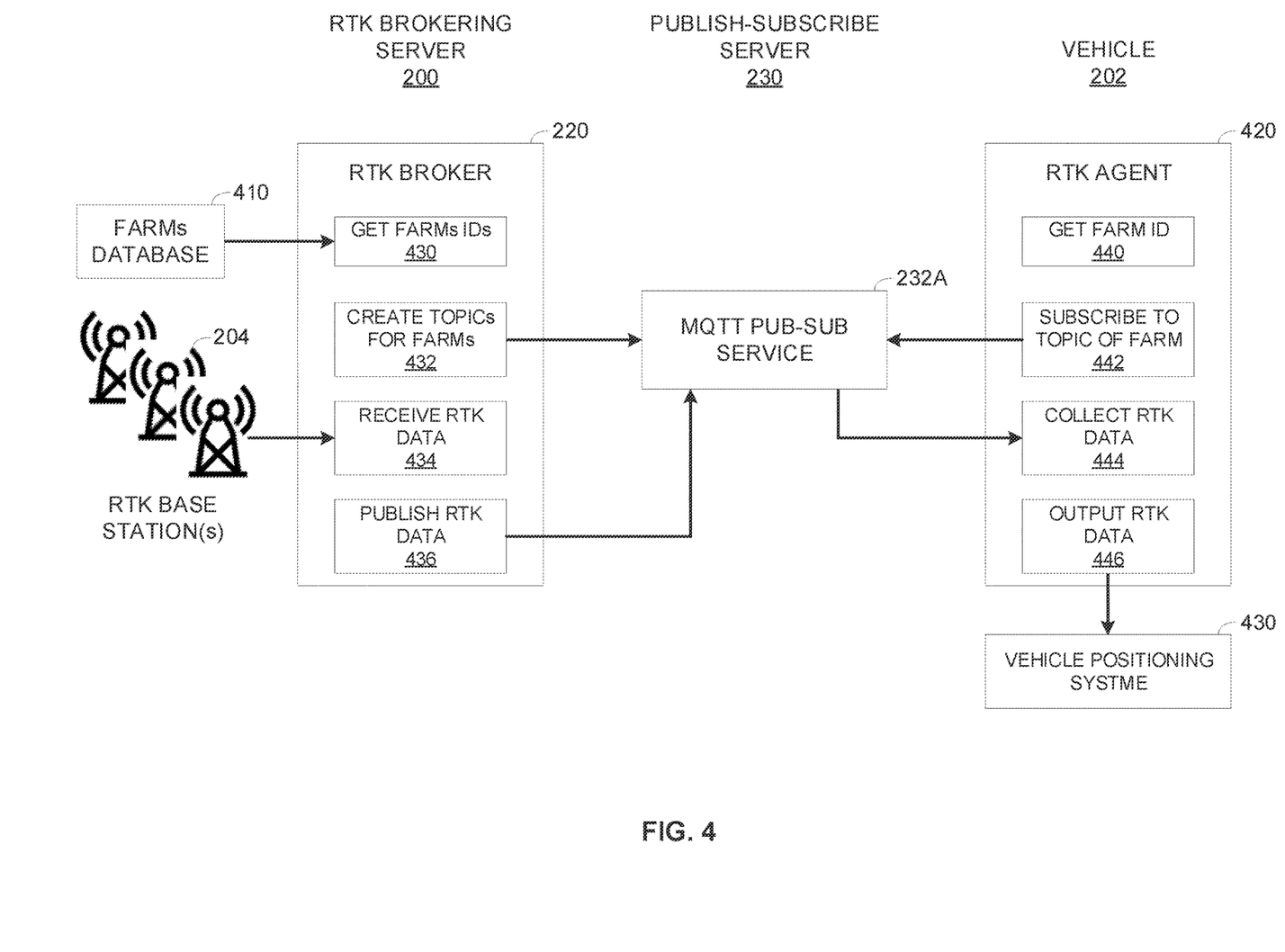
FIG. 4 is a block diagram of an exemplary system for distributing and collecting RTK positioning correction data using a publish-subscribe service, according to some embodiments of the present invention.

Reference is now made to FIG. 4, which is a block diagram of an exemplary system for distributing and collecting RTK positioning correction data using a publish-subscribe service, according to some embodiments of the present invention.

An exemplary RTK brokering server such as the RTK brokering server 200 may be deployed to execute an RTK broker such as the RTK broker 220 for distributing RTK positioning correction data to one or more vehicles such as the vehicles 202 each executing a respective RTK agent 420.

In particular, the RTK brokering server 200 may distribute the RTK data to the vehicles 202 via a publish-subscribe server such as the publish-subscribe server 230 hosting and/or executing a publish-subscribe service such as the publish-subscribe service 232, for example, an MQTT service 232A.

The RTK broker 220 may create topics on the MQTT service 232A according to predefined IDs as described herein before, for example, names of a plurality of farms each operating one or more vehicles 202, specifically agricultural vehicles, for example, tractors in a respective agricultural area associated with the respective farm.

The RTK broker 220 may therefore first obtain (430) farm IDs, for example, names, codes, and/or the like of farms whose tractors 202 the RTK broker 220 is deployed to serve. Each of the farms IDs may be optionally correlated with a geographical area associated with the farm, for example, the borders of the farm's associated geographical area.

The RTK broker 220 may obtain the farms IDs from one or more sources. For example, the RTK broker 220 may communicate, for example, via a network such as the network 208, with a farms database 410 storing one or more records listing the farms IDs to query and fetch the farm IDs of one or more farms. In another example, RTK broker 220 may communicate, for example, via the network 208, with one or more systems, servers, devices, controller units, and/or the like associated with one or more of the farms to obtain their farms IDs.

The RTK broker 220 may then create (432) a plurality of topics in the MQTT service 232A each associated with a respective zone such as the dynamically defined zone 208 which is dynamically defined to contain the tractors 202 of a respective one of the farms such that each topic is correlated with a respective dynamically defined zone 208.

The RTK broker 220 may receive (434) RTK positioning correction data from one or more RTK base stations such as the RTK base station 204 having coverage areas such as the coverage area 206 containing the zones 208 dynamically defined for the plurality of farms.

The RTK broker 220 may publish (436), continuously, periodically, and/or on-command, the received RTK data at the MQTT service 232A. In particular, the RTK broker 220 may publish RTK data relating to each dynamically defined zone 208, which is associated with a respective farm, under each a respective topic correlated with the respective farm.

The RTK agent 420 executed by one or more tractors 202 operated affiliated with one or more of the farms may first get (440) the farm ID identifying its affiliated farm. For example, the farm ID may be programmed, and/or stored locally at one or more of the tractors 202. In another example, one or more of the tractors 202 may communicate, for example, via the network 208, with one or more of the systems, servers, devices, controller units, and/or the like associated with their affiliated farms to obtain their farms IDs.

The RTK agent 420 may then subscribe (442) to one of the topics created by the RTK broker 220 at the MQTT service 232A. Specifically, the RTK agent 420 of each tractor 202 may subscribe to a respective topic having the farm ID of the farm affiliated with the respective tractor 202.

The RTK agent 420 may, continuously, periodically, and/or on-command, monitor and collect (444) RTK data, for example, Real Time Correction Messages (RTCM) published by the RTK broker 220 under the topic to which the RTK agent 420 is subscribed. Optionally, the RTK agent 420 may parse the RTK data, for example, the RTCMs to extract RTK positioning correction data.

The RTK agent 420 may output the collected RTK data to one or more vehicle positioning systems 450, for example, a navigation system, a navigation application, and/or the like controlling movement, navigation and/or operation of the tractor 202 which may use the RTK data to compute an improved accuracy positioning (location) of the tractor 202.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms RTK positioning correction data, positioning sensor, and positioning streaming protocols are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A real time kinematics (RTK) brokering system for distributing RTK positioning data to one or more vehicles, comprising:
   at least one RTK server adapted to:
     receive positioning data of a plurality of vehicles;
     dynamically define a plurality of zones based on the positioning data of a plurality of vehicles, each of the plurality of dynamically defined zones is associated with a respective group of vehicles of the plurality of vehicles which are located within borders of the respective dynamically defined zone, each of the plurality of dynamically defined zones is contained within a coverage area of at least one RTK base station;
     receive RTK positioning correction data relating to each dynamically defined zone from the at least one RTK base station covering the respective dynamically defined zone; and
     distribute the RTK positioning correction data relating to each dynamically defined zone to the respective group of vehicles associated with the respective dynamically defined zone;
   wherein at least one vehicle of each group of vehicles computes its location with improved accuracy based on the related RTK positioning correction data.

2. The system of claim 1, wherein the coverage area of each of the at least one RTK base station defines a respective area in which the improved accuracy location is effectively computed using RTK positioning correction data received from the respective RTK base station.

3. The system of claim 2, wherein the at least one RTK server is further adapted to adjust the borders of at least one of the plurality of dynamically defined zones according to an adjusted positioning of at least one of the plurality of vehicles.

4. The system of claim 3, further comprising dynamically defining the borders of the plurality of zones in each time period by minimizing a number of a plurality of closing polygons defining the borders of the plurality of dynamically defined zones, the plurality of closing polygons are computed with respect to the location of active RTK base stations, a location of vehicles requesting RTK positioning correction data, and an accuracy threshold defining a bounded limit of positioning accuracy per each vehicle.

5. The system of claim 1, wherein the at least one RTK server is further adapted to:
   associate each of the plurality of dynamically defined zones with a respective one of a plurality of topics identifying the respective dynamically defined zone; and
   publish RTK positioning correction data relating to each dynamically defined zone correlated with the topic of the respective dynamically defined zone in at least one publish-subscribe service accessible to the at least one vehicle via at least one network;
   wherein the at least one vehicle is adapted to:
     subscribe to the at least one publish-subscribe service according to the topic associated with the respective dynamically defined zone in which the at least one vehicle is located, and
     collect the RTK positioning correction data published for the respective dynamically defined zone under the respective topic.

6. The system of claim 5, wherein the at least one vehicle determines the respective dynamically defined zone in which it is located according to the positioning data of the at least one vehicle compared to a plurality of closing polygons defining the borders of a respective one of the plurality of dynamically defined zones, each of the plurality of topics is correlated with a plurality of closing polygons defining the borders of its associated dynamically defined zone.

7. The system of claim 1, wherein the RTK positioning correction data is received according to at least one NTRIP protocol, NTRIP is abbreviation of networked transport of radio technical commission for maritime services (RTCM) via internet protocol.

8. The system of claim 1, wherein the RTK positioning correction data relating to at least one of the plurality of dynamically defined zones is received from a plurality of RTK base stations covering the respective dynamically defined zone.

9. The system of claim 8, wherein the plurality of RTK base stations are operated by at least one RTK vendor.

10. The system of claim 1, wherein the at least one RTK server utilizes at least one multi-threaded cloud based service adapted to support simultaneously a plurality of vehicles located in the plurality of dynamically defined zones.

11. A method of brokering RTK positioning data to one or more vehicles, comprising:
    using at least one RTK server for:
      receiving positioning data of a plurality of vehicles;
      dynamically defining a plurality of zones based on the positioning data of a plurality of vehicles, each of the plurality of dynamically defined zones contains is associated with a respective group of vehicles of the plurality of vehicles located within borders of the respective dynamically defined zone, each of the plurality of dynamically defined zones is contained within a coverage area of at least one RTK base station;

receiving RTK positioning correction data relating to each dynamically defined zone from the at least one RTK base station covering the respective dynamically defined zone; and distributing the RTK positioning correction data relating to each dynamically defined zone to the respective group of vehicles associated with the respective dynamically defined zone;

wherein at least one vehicle of each group of vehicles computes its location with improved accuracy based on the related RTK positioning correction data.

12. The method of claim 11, wherein the coverage area of each of the at least one RTK base station defines a respective area in which the improved accuracy location is effectively computed using RTK positioning correction data received from the respective RTK base station.

13. The method of claim 12, wherein the at least one RTK server is further adapted to adjust the borders of at least one of the plurality of dynamically defined zones according to an adjusted positioning of at least one of the plurality of vehicles.

14. The method of claim 13, wherein the borders of the plurality of dynamically defined zones are computed in each time period by minimizing a number of a plurality of closing polygons defining the borders of the plurality of dynamically defined zones, the plurality of closing polygons are computed with respect to the location of active RTK base stations, a location of vehicles requesting RTK positioning correction data, and an accuracy threshold defining a bounded limit of positioning accuracy per each vehicle.

15. The method of claim 11, wherein the at least one RTK server is further adapted to:

associate each of the plurality of dynamically defined zones with a respective one of a plurality of topics identifying the respective dynamically defined zone; and publish RTK positioning correction data relating to each dynamically defined zone correlated with the topic of the respective dynamically defined zone in at least one publish-subscribe service accessible to the at least one vehicle via at least one network;

wherein the at least one vehicle is adapted to:

subscribe to the at least one publish-subscribe service according to the topic associated with the respective dynamically defined zone in which the at least one vehicle is located, and collect the RTK positioning correction data published for the respective dynamically defined zone under the respective topic.

16. The method of claim 15, wherein the at least one vehicle determines the respective dynamically defined zone in which it is located according to the positioning data of the at least one vehicle compared to a plurality of closing polygons defining the borders of a respective one of the plurality of dynamically defined zones, each of the plurality of topics is correlated with a plurality of closing polygons defining the borders of its associated dynamically defined zone.

17. The method of claim 11, wherein the RTK positioning correction data is received according to at least one NTRIP protocol, NTRIP is abbreviation of networked transport of radio technical commission for maritime services (RTCM) via internet protocol.

18. The method of claim 11, wherein the RTK positioning correction data relating to at least one of the plurality of dynamically defined zones is received from a plurality of RTK base stations covering the respective dynamically defined zone.

19. The method of claim 18, wherein the plurality of RTK base stations are operated by at least one RTK vendor.

20. The method of claim 11, wherein the at least one RTK server utilizes at least one multi-threaded cloud based service adapted to support simultaneously a plurality of vehicles located in the plurality of dynamically defined zones.

* * * * *